(12) United States Patent
Miura et al.

(10) Patent No.: US 11,214,496 B2
(45) Date of Patent: Jan. 4, 2022

(54) ELECTROLYTIC MANGANESE DIOXIDE AND METHOD FOR ITS PRODUCTION, AND ITS APPLICATION

(71) Applicant: TOSOH CORPORATION, Yamaguchi (JP)

(72) Inventors: Hiroshi Miura, Yamaguchi (JP); Kazumasa Suetsugu, Yamaguchi (JP); Takayuki Shoji, Miyazaki (JP)

(73) Assignee: TOSOH CORPORATION, Yamaguchi (JP)

( * ) Notice: Subject to any disclaimer, the term of this patent is extended or adjusted under 35 U.S.C. 154(b) by 575 days.

(21) Appl. No.: 16/086,713

(22) PCT Filed: Mar. 24, 2017

(86) PCT No.: PCT/JP2017/012061
§ 371 (c)(1),
(2) Date: Sep. 20, 2018

(87) PCT Pub. No.: WO2017/170240
PCT Pub. Date: Oct. 5, 2017

(65) Prior Publication Data
US 2019/0119124 A1    Apr. 25, 2019

(30) Foreign Application Priority Data

Mar. 29, 2016 (JP) .............. JP2016-066038
Oct. 31, 2016 (JP) .............. JP2016-213808

(51) Int. Cl.
| | | |
|---|---|---|
| *C01G 45/02* | (2006.01) | |
| *C25B 1/21* | (2006.01) | |
| *H01M 4/50* | (2010.01) | |
| *H01M 4/02* | (2006.01) | |

(52) U.S. Cl.
CPC .............. *C01G 45/02* (2013.01); *C25B 1/21* (2013.01); *H01M 4/50* (2013.01); *C01P 2002/74* (2013.01); *C01P 2004/51* (2013.01); *C01P 2006/10* (2013.01); *C01P 2006/11* (2013.01); *C01P 2006/12* (2013.01); *C01P 2006/40* (2013.01); *H01M 2004/028* (2013.01)

(58) Field of Classification Search
CPC ............ C01G 45/02; C25B 1/21; H01M 4/50
See application file for complete search history.

(56) References Cited

U.S. PATENT DOCUMENTS

| | | |
|---|---|---|
| 2012/0141361 A1 | 6/2012 | Suetsuga et al. |
| 2014/0349174 A1 | 11/2014 | Nunome et al. |
| 2015/0030926 A1* | 1/2015 | Suetsugu .............. C25B 1/21 |
| | | 429/224 |

FOREIGN PATENT DOCUMENTS

| | | |
|---|---|---|
| CN | 103636031 | 3/2014 |
| EP | 2471967 | 7/2012 |
| JP | 2006-108081 | 4/2006 |
| JP | 2007-141643 | 6/2007 |
| JP | 2009-135067 | 6/2009 |
| JP | 2011-068552 | 4/2011 |
| JP | 2011-140711 | 7/2011 |
| WO | 2013/157181 | 10/2013 |

OTHER PUBLICATIONS

Extended European Search Report in EP 17774777.1 dated Oct. 9, 2019.
International Search Report in International Patent Application No. PCT/JP2017/012061, dated Jun. 20, 2017.
International Preliminary Report on Patentability in International Patent Application No. PCT/JP2017/012061, dated Oct. 2, 2018.

* cited by examiner

*Primary Examiner* — James A Fiorito
(74) *Attorney, Agent, or Firm* — Greenblum & Bernstein, P.L.C.

(57) ABSTRACT

To provide electrolytic manganese dioxide excellent in packing property and high-rate discharge characteristics when used as a cathode material for alkaline dry cells. Electrolytic manganese dioxide in which the half-value width of the (110) plane in XRD measurement using CuKα line as the radiation source is at least 1.8° and less than 2.2°, the peak intensity ratio of X-ray diffraction peaks (110)/(021) is at least 0.70 and at most 1.00, and the JIS-pH (JIS K1467) is at least 1.5 and less than 5.0; a method for producing the electrolytic manganese dioxide; and its application.

11 Claims, No Drawings

ELECTROLYTIC MANGANESE DIOXIDE AND METHOD FOR ITS PRODUCTION, AND ITS APPLICATION

TECHNICAL FIELD

The present invention relates to electrolytic manganese dioxide and a method for its production, and its application. And more specifically, to electrolytic manganese dioxide to be used as a cathode active material for e.g. manganese dry cells, particularly alkaline manganese dry cells, and a method for its production.

BACKGROUND ART

Manganese dioxide is known as a cathode active material for e.g. alkaline dry cells, particularly, alkaline manganese dry cells, and has such merits that it is excellent in storage stability and is inexpensive. In particular, the alkaline manganese dry cells using manganese dioxide as the cathode active material, are excellent in the discharge characteristics in a wide range of discharge rate from low-rate discharge to high-rate discharge, and thus are widely used in electronic cameras, portable tape recorders, portable information devices, and further game machines and toys, and there is a rapidly growing demand for them in recent years.

However, an alkaline manganese dry cell had a problem such that the utilization rate of manganese dioxide as the cathode active material tends to decrease with the increase of the discharge current, and it cannot be used in such low discharge voltage condition, whereby the substantial discharge capacity tends to be significantly impaired. That is, if the alkaline manganese dry cell was used in an instrument using a large current (high-rate discharge), manganese dioxide as the cathode active material packed in the alkaline manganese dry cell, was not fully utilized, and thus, it had such a disadvantage that the useful time was short.

Heretofore, in order to improve the high-rate discharge characteristics, manganese dioxide has been proposed which is characterized in that in XRD measurement using CuKα line as the radiation source, the half width of the (110) plane is at least 2.2° and at most 2.9°, and further, the peak intensity ratio of X-ray diffraction peaks (110)/(021) is at least 0.50 and at most 0.80 (Patent Document 1).

Further, an electrolytic manganese dioxide has also been proposed which is characterized in that peak intensity ratio is 0.50<I(110)/I(021)<0.70 and I(221)/I(021)<0.70 (Patent Document 2).

Further, it has also been proposed to use, manganese dioxide to be used in an alkaline dry cell, of which the half width of the (110) plane by powder X-ray diffraction measurement is within a range of from 2.00° to 2.40° (Patent Document 3).

However, even the manganese dioxides having the above characteristics are not sufficient to solve the problem in high-rate discharge, and excellent manganese dioxide capable of providing a high capacity and a long life under high-rate discharge conditions to take out a large current in a short time, i.e. manganese dioxide more excellent in so-called high-rate discharge characteristics, has been desired.

PRIOR ART DOCUMENTS

Patent Documents

Patent Document 1: JP-A-2009-135067
Patent Document 2: JP-A-2007-141643
Patent Document 3: WO2013/157181

DISCLOSURE OF INVENTION

Technical Problem

An object of the present invention is to provide electrolytic manganese dioxide which has a high packing property and is different in crystallinity from conventional ones and which is electrolytic manganese dioxide to be used as a cathode active material for a manganese dry cell especially excellent in high rate discharge characteristics, particularly for an alkaline manganese dry cell and a method for its production and its application.

Solution to Problem

The present inventors have conducted intensive studies on electrolytic manganese dioxide to be used as a cathode active material for a manganese dry cell, particularly an alkaline manganese dry cell, and as a result, have found that by having such features that the half width of the (110) plane in XRD measurement using CuKα line as the radiation source is at least 1.8° and less than 2.2°, the peak intensity ratio of X-ray diffraction peaks (110)/(021) is at least 0.70 and at most 1.00, and further the JIS-pH (JIS K1467) is at least 1.5 and less than 5.0, it becomes to be a cathode material having a high filling property and excellent high-rate discharge characteristics, and thus have accomplished the present invention.

That is, the present invention resides in the following [1] to [10].

[1] Electrolytic manganese dioxide, characterized in that the half width of the (110) plane in XRD measurement using CuKα line as the radiation source is at least 1.8° and less than 2.2°, the peak intensity ratio of X-ray diffraction peaks (110)/(021) is at least 0.70 and at most 1.00, and further, the JIS-pH (JIS K1467) is at least 1.5 and less than 5.0.

[2] The electrolytic manganese dioxide according to [1], characterized in that the half width of the (110) plane in XRD measurement using CuKα line as the radiation source is at least 2.0° and at most 2.1°.

[3] The electrolytic manganese dioxide according to [1] or [2], characterized in that the peak intensity ratio of X-ray diffraction peaks (110)/(021) is at least 0.80 and at most 0.90.

[4] The electrolytic manganese dioxide according to any one of [1] to [3], characterized in that the BET specific surface area is at least 10 $m^2/g$ and at most 40 $m^2/g$.

[5] The electrolytic manganese dioxide according to any one of [1] to [4], characterized in that the alkali potential is at least 270 mV and less than 310 mV.

[6] The electrolytic manganese dioxide according to any one of [1] to [5], characterized in that in the volume frequency distribution, with respect to the most frequent particle size (A) and the particle size width (B) at a ½ height of the most frequent particle size (A), the value of (B)/(A) is larger than 1.0 and at most 2.0.

[7] A method for producing the electrolytic manganese dioxide as defined in any one of [1] to [6], characterized in that the electrolytic current density is at least 0.2 $A/dm^2$ and less than 0.5 $A/dm^2$, and the number of days for the electrolysis is at least 18 days.

[8] The method for producing the electrolytic manganese dioxide according to [7], characterized in that a sulfuric acid-manganese sulfate mixed solution is used whereby the sulfuric acid concentration in the electrolyte at the termination of electrolysis is higher than the sulfuric acid concentration in the electrolyte at the initiation of electrolysis, and the sulfuric acid concentration in the electrolyte at the termination of electrolysis is at least 32 g/L and at most 55 g/L.

[9] A cathode active material for a dry cell, characterized by comprising the electrolytic manganese dioxide as defined in any one of [1] to [6].

[10] A dry cell characterized by comprising the cathode active material for a dry cell as defined in [9].

Advantageous Effects of Invention

The electrolytic manganese dioxide of the present invention is excellent in packing property and high-rate discharge characteristics when used as a cathode material for alkaline dry cells, and further, it is possible to obtain the electrolytic manganese dioxide of the present invention by the production method of the present invention.

DESCRIPTION OF EMBODIMENTS

Hereinafter, the present invention will be described in more detail.

The electrolytic manganese dioxide of the present invention is such that the half width of the (110) plane in XRD measurement using CuKα line as the radiation source is at least 1.8° and less than 2.2°, and the peak intensity ratio of X-ray diffraction peaks (110)/(021) is at least 0.70 and at most 1.00.

When the profile of XRD measurement using CuKα line as the radiation source satisfies the above characteristics, the electrolytic manganese dioxide becomes to have a specific crystal structure and excellent high-rate characteristics. The reason as to why the electrolytic manganese dioxide having a characteristic crystal structure as described above has such excellent high-rate characteristics is not clearly understood, but firstly, as the half width of the (110) plane satisfies the above characteristics, the electrolytic manganese dioxide becomes to have extremely high crystallinity. Usually, the discharge system of the electrolytic manganese dioxide is represented by the following formula.

$$MnO_2 + H_2O + e^- \rightarrow MnOOH + OH^-$$   Formula 1

At that time, $MnO_2$ takes in $[H^+]$ from $H_2O$ and is changed to MnOOH, in which $[H^+]$ diffuses via hydroxy groups of e.g. structural defects in the crystal, and as crystallinity is higher, hydroxy groups tend to be regularly arranged, whereby $[H^+]$ tends to readily diffuse, and further, as compared to the (021) plane, hydroxy groups in the (110) plane are more effective for diffusion of $[H^+]$, and thus, by the crystal structure having both characteristics, the discharge reaction at a high rate is considered to proceed more smoothly.

If the half width of the (110) plane is at least 2.2, crystallinity tends to be insufficient, and if it is less than 1.8, crystallinity tends to be too high, hence hydroxy groups located at the structural defects, effective in the diffusion of $[H^+]$ will decrease, whereby the discharge performance is considered to be reduced. In order to conduct the diffusion of $[H^+]$ more smoothly, the half width of the (110) plane is preferably at least 1.9° and at most 2.1°, more preferably at least 2.0° and at most 2.1°.

If the peak intensity ratio of (110)/(021) is less than 0.70, the (110) plane which is preferred for the diffusion of $[H^+]$ will be insufficient, whereas, if it becomes larger than 1.00, the crystallinity becomes too high and hydroxy groups located at the structural defects, effective in the diffusion of $[H^+]$ will decrease, whereby the discharge performance is considered to be reduced. In order to conduct the diffusion of $[H^+]$ smoothly, the peak intensity ratio of (110)/(021) is preferably at least 0.75 and at most 0.95, more preferably at least 0.80 and at most 0.90.

According to the electrolytic manganese dioxide of the present invention, the JIS-pH based on JIS K1467 (hereinafter referred to simply as "the JIS-pH") is at least 1.5 and less than 5.0. If the JIS-pH is at least 5.0, the discharge characteristics will not be sufficient, and if it is less than 1.5, it tends to corrode a metal material e.g. a processing equipment of the cathode material or a dry cell can. In order to let the reaction of the formula 1 proceed efficiently on the surface of electrolytic manganese dioxide, without practical problem, the JIS-pH is preferably at least 1.8 and at most 2.4.

According to the electrolytic manganese dioxide of the present invention, the BET specific surface area is preferably at least 10 m²/g and at most 40 m²/g, more preferably at least 20 m²/g and at most 30 m²/g. By adjusting the BET specific surface area to be within the above range, it is possible to make electrolytic manganese dioxide to have a high-density and a high packing property. If the BET specific surface area is lower than 10 m²/g, the reaction area of the electrolytic manganese dioxide decreases, whereby the discharge capacity will be low. On the other hand, if the BET specific surface area exceeds 40 m²/g, the packing property of the electrolytic manganese dioxide decreases, whereby in a case the discharge capacity tends to be low.

According to the electrolytic manganese dioxide of the present invention, the alkali potential is preferably at least 270 mV and less than 310 mV. When the alkali potential is at least 270 mV and less than 310 mV, in a case where used as a cathode material for an alkaline manganese dry cell, the discharge voltage of the dry cell will be increased, and it is possible to lengthen the discharge time until the available discharge voltage lower limit. The alkali potential is more preferably at least 280 mV and less than 310 mV, further preferably at least 290 mV and less than 310 mV. The alkali potential is measured in a 40 wt % KOH aqueous solution by using a mercury/mercury oxide reference electrode as the standard.

According to the electrolytic manganese dioxide of the present invention, so that the dry cell discharge reaction against a background of diffusion of protons from the surface to the interior of particles will be good, the discharge characteristics can be maintained to be high and in order to prevent corrosiveness to metallic materials, the alkali metal content is preferably at least 0.02 wt % and less than 0.10 wt %, more preferably at least 0.02 wt % and at most 0.09 wt %. Since the alkali metal contained in the electrolytic manganese dioxide is mainly derived from the neutralizing agent, most of it is present as adsorbed on the particle surface. As the industrial neutralizing agent, sodium hydroxide is used, and thus, sodium may be mentioned as the main alkali metal contained in manganese dioxide.

According to the electrolytic manganese dioxide of the present invention, in order to prevent the deterioration during the storage of the dry cell and to facilitate stabilization of the dry cell voltage, and so that it is possible to prevent the corrosion of a metal material of an apparatus for producing a cathode material or a can material inside of a dry cell, the content of sulfate radical ($SO_4$) is preferably less than 1.30 wt %, more preferably at most 1.25 wt %.

According to the electrolytic manganese dioxide of the present invention, in order to bring powder properties to be low and high-rate characteristics to be excellent, in the volume frequency distribution, with respect to the most frequent particle size (A) and the particle size width (B) at a ½ height of the most frequent particle size (A), the value of (B)/(A) is preferably larger than 1.0 and at most 2.0. The most frequent particle size (A) in the volume frequency distribution, is meant for the particle size at which the volume frequency in the distribution is largest, and the particle size width (B) at a ½ height of the most frequent particle size (A) is meant for the spread in the particle diameter of from the minimum value to the maximum value of the particle diameter. By adjusting the value of (B)/(A) to be larger than 1.0, it is possible to make the inter-particle resistance to be small, and by adjusting it to be at most 2.0, it is possible to make milling efficiency to be high and the productivity to be high, and it is more preferably larger than 1.0 and at most 1.7, further preferably larger than 1.1 and at most 1.6.

Next, the method for producing electrolytic manganese dioxide of the present invention will be described.

According to the method of producing electrolytic manganese dioxide of the present invention, the electrolytic current density is at least $0.2$ A/dm$^2$ and less than $0.5$ A/dm$^2$. If the electrolytic current density is less than $0.2$ A/dm$^2$, the productivity will be extremely lowered, such being undesirable. On the other hand, if it becomes at least $0.5$ A/dm$^2$, crystallinity decreases, whereby it becomes impossible to obtain the crystal structure of the present invention. From the viewpoint of the productivity and crystallinity as well as the packing property, the electrolytic current density is preferably at least $0.29$ A/dm$^2$ and at most $0.45$ A/dm$^2$, more preferably at least $0.29$ A/dm$^2$ and at most $0.40$ A/dm$^2$.

The electrolysis temperature is, in order to maintain the current efficiency to maintain the production efficiency and to suppress the evaporation of the electrolyte and to prevent an increase in heating costs, preferably at least 90° C. and at most 99° C. From the viewpoint of the current efficiency and heating costs, the electrolysis temperature is more preferably at least 93° C. and at most 97° C., further preferably at least 95° C. and less than 97° C.

As the electrolyte in the electrolytic cell, a sulfuric acid-manganese sulfate mixed solution is used. Here, the sulfuric acid concentration is a value excluding sulfate ions of manganese sulfate. Sulfuric acid in the electrolyte is controlled as a sulfuric acid concentration, and it is possible to make the sulfuric acid concentration to be constant during the electrolysis period, or to optionally change the sulfuric acid concentration during the electrolysis period, and in particular, it is possible to control the sulfuric acid concentration at the termination of electrolysis to be higher than the sulfuric acid concentration at the initiation of electrolysis. In such a case, the sulfuric acid concentration during the electrolysis period or at the initiation of electrolysis is preferably at least 25 g/L and at most 40 g/L, more preferably at least 28 g/L and at most 38 g/L. Further, the sulfuric acid concentration at the termination of electrolysis is preferably at least 32 g/L and at most 55 g/L, more preferably more than 40 g/L and at most 45 g/L. Thus, by optionally changing the sulfuric acid concentration, and by conducting electrolysis at a relatively low sulfuric acid concentration in the first period, it is possible to reduce a corrosion damage to the electrode substrate thereby to obtain manganese dioxide having high crystallinity and high packing property, and by conducting electrolysis at a relatively high sulfuric acid concentration in the second period, the electrode substrate is less susceptible to corrosion damage, since it is already covered with the electrolytic manganese dioxide deposit, and further, in addition to the feature of the first period, the potential will further increase, whereby it becomes more easy to obtain electrolytic manganese dioxide excellent in high-rate characteristics. Further, it is preferred to switch the sulfuric acid concentration in the first period and the second period of electrolysis, i.e. not to gradually change the sulfuric acid concentration in the electrolyte from the initiation towards the termination of electrolysis. There is no particular limitation as to the ratio of the first period electrolysis to the second period electrolysis, but, for example, the ratio of the electrolysis time at a low sulfuric acid concentration and a high sulfuric acid concentration is preferably in a range of from 1:9 to 9:1, especially from 3:7 to 7:3.

The manganese ion concentration in the manganese sulfate solution to be supplied to the electrolytic cell is not limited, and may, for example, be from 25 to 60 g/L.

The method for producing electrolytic manganese dioxide of the present invention, may also be carried out by a so-called suspension electrolysis method which comprises continuously mixing manganese oxide particles in a sulfuric acid-manganese sulfate mixed solution.

According to the method for producing electrolytic manganese dioxide of the present invention, the number of days for the electrolysis is at least 18 days. If the number of days for the electrolysis is less than 18 days, the amount of the electrodeposit obtainable in one electrolysis operation is not sufficient, and the production efficiency is low. In consideration of the productivity, the number of days for the electrolysis is preferably at least 18 days and at most 40 days, more preferably at least 19 days and at most 35 days.

The method for producing electrolytic manganese dioxide of the present invention is to mill the electrolytic manganese dioxide obtained by the electrolysis. For the milling, for example, a roller mill, a jet mill, etc. may be used. The roller mill may, for example, be a centrifugal roller mill, a vertical type Loesche mill, etc. Among roller mills, in view of excellency in cost and durability and being suitable for industrial use, preferred is a roller mill which is capable of milling a raw material having such a hardness that the micro Vickers hardness is at least 400 HV (JIS Z2244), and which has a mill motor of at least 20 kW and at most 150 kW.

By setting the milling to be a single stage operation, it is possible to get the particle size formulation of the present invention at low costs.

Further, by mixing electrolytic manganese dioxide with a smaller maximum frequency particle size to the pulverized electrolytic manganese dioxide, it is possible to control the maximum frequency particle size and the particle size distribution width to obtain the desired particle size formulation. The mixing amount of the manganese dioxide with a smaller maximum frequency particle size is set to be an amount not exceeding the weight of the milled electrolytic manganese dioxide and is preferably at least 10 wt % and at most 40 wt %, in the total weight. The method of mixing is preferably mixing in a dry system from the viewpoint of costs, and in the case of mixing in a wet system, it is preferred that the pH of the mixed slurry is adjusted to be from 2.5 to 6.5, whereby it will be easy to flocculate fine particles of at most 1 µm on the surface of larger particles. Further, with respect to the control of the particle size formulation, the particle size formulation may be adjusted by classification after the milling, or by an air flow classification in a dry system or by a dispersing classification in a wet system, it is possible to adjust the particle size formulation, or the amount or flocculated state of fine particles of at most 1 µm.

There is no particular limitation as to the method of using the electrolytic manganese dioxide of the present invention as a cathode active material for an alkaline manganese dry cell, and by a known method, it may be mixed with additives and used as a cathode mixed material. For example, to the electrolytic manganese dioxide, carbon for imparting conductivity, an electrolyte, etc. may be added to prepare a mixed powder, which may be press-molded in a disc-shape or ring-shape to obtain a powder molded body which is useful as a cathode for a dry cell.

EXAMPLES

Hereinafter, the present invention will be described in further detail with reference to Examples and Comparative Examples, but the present invention is by no means limited by these Examples.

<Measurement of Alkali Potential of Electrolytic Manganese Dioxide>

The alkali potential of electrolytic manganese dioxide was measured in a 40 wt % KOH aqueous solution as follows.

To 3 g of the electrolytic manganese dioxide, carbon as a conductive agent was added in an amount of 0.9 g to obtain a mixed powder, and 4 ml of a 40 wt % KOH aqueous solution was added to this mixed powder, to obtain a mixture slurry of the electrolytic manganese dioxide, carbon and the aqueous KOH solution. The potential of the mixture slurry was measured, based on the mercury/mercury oxide reference electrodes, to obtain the alkali potential of the electrolytic manganese dioxide.

<Measurement of Press Density of Electrolytic Manganese Dioxide>

For the press density of electrolytic manganese dioxide, electrolytic manganese dioxide having a predetermined weight was put in a ring-shaped mold, and pressed by a piston under a pressure of 1 ton/cm$^2$ and maintained for 3 seconds. Thereafter, the press-molded pellet of electrolytic manganese dioxide was taken out, whereupon from its height and area, the volume was obtained, and from its weight and volume, the density of the pellet was obtained, and the press density was obtained as its relative value based on the measurement result in Comparative Example 2 being 100%. The higher the press density is represented in the better the packing property.

<Measurement of Half Width (Full Width at Half Maximum: FWHM) by XRD Measurement>

The half width (full width at half maximum: FWHM) of the diffraction line around 22±1° as 2θ of the electrolytic manganese dioxide was measured by using an X-ray diffraction apparatus (trade name: MXP-3, manufactured by MAC Science Corporation). The measurement was carried out by using CuKα line (λ=1.5405 Å) as the radiation source, the measurement mode was step scanning, the scanning condition was 0.04° per second, the measuring time was 3 seconds, and the measurement range was within a range of 2θ being from 5° to 80°.

<Calculation of (110)/(021) by XRD Measurement>

In an XRD pattern obtained in the same manner as FWHM, the diffraction line=around 22±1° as 2θ was adopted as the peak corresponding to the (110) plane, and the diffraction line around 37±1° as 2θ was adopted as the peak corresponding to the (021) plane. The peak intensity of the (110) plane was divided by the peak intensity of the (021) plane to obtain (110)/(021).

<Measurement of BET Specific Surface Area>

The BET specific surface area of the electrolytic manganese dioxide was measured by nitrogen adsorption by a BET one point method. As the measuring apparatus, a gas adsorption specific surface area measuring apparatus (Flow Sorb III, manufactured by Shimadzu Corporation) was used. Prior to the measurement, the electrolytic manganese dioxide was deaerated by heating at 150° C. for 1 hour.

<JIS-pH of Electrolytic Manganese Dioxide>

The JIS-pH of the electrolytic manganese dioxide was measured by JIS K1467 (ammonium chloride method). That is, a method was employed wherein a certain amount of manganese dioxide was put in a certain amount of an ammonium chloride buffer solution, and the pH of the supernatant was obtained.

<Sulfate Radical and Sodium Contents>

The sulfate radical and sodium contents in the electrolytic manganese dioxide powder particles were measured by dissolving the electrolytic manganese dioxide powder in hydrochloric acid and hydrogen peroxide and measuring the obtained solution by an atomic absorption spectrometry.

<Method for Measuring Particle Size Formulation of Electrolytic Manganese Dioxide>

Measurement of the particle size formulation of electrolytic manganese dioxide was conducted in accordance with the following procedure. 0.03 g of the electrolytic manganese dioxide was put into 20 ml of pure water, and by ultrasonic irradiation, a dispersion slurry was prepared, whereupon measurement of the volume frequency distribution was conducted by a particle size distribution measuring apparatus (MICROTRAC HRA, manufactured by Nikkiso). At that time, in order to measure the accurate amount by dispersing fine particles of at most 1 μm in an aggregated state, it is always necessary to conduct dispersion treatment such as ultrasonic irradiation. If no dispersion treatment is conducted, the fine particles will be measured in a state as aggregated, whereby the amount of the fine particles cannot be accurately measured. Further, at the time of calculating the volume frequency distribution, measurements were conducted at 101 sections to match the 101 channels for measurement set in the particle size distribution measuring apparatus in non-spherical approximation (704.00, 645.60, 592.00, 542.90, 497.80, 456.50, 418.60, 383.90, 352.00, 322.80, 296.00, 271.40, 248.90, 228.20, 209.30, 191.90, 176.00, 161.40, 148.00, 135.70, 124.50, 114.10, 104.70, 95.96, 88.00, 80.70, 74.00, 67.86, 62.23, 57.06, 52.33, 47.98, 44.00, 40.35, 37.00, 33.93, 31.11, 28.53, 26.16, 23.99, 22.00, 20.17, 18.50, 16.96, 15.56, 14.27, 13.08, 12.00, 11.00, 10.09, 9.25, 8.48, 7.78, 7.13, 6.54, 6.00, 5.50, 5.04, 4.63, 4.24, 3.89, 3.57, 3.27, 3.00, 2.75, 2.52, 2.31, 2.12, 1.95, 1.78, 1.64, 1.50, 1.38, 1.26, 1.16, 1.06, 0.97, 0.89, 0.82, 0.75, 0.69, 0.63, 0.58, 0.53, 0.49, 0.45, 0.41, 0.38, 0.34, 0.32, 0.29, 0.27, 0.24, 0.22, 0.20, 0.19, 0.17, 0.16, 0.15, 0.13, 0.12/μm).

<Evaluation of High-Rate Discharge Characteristics>

An aqueous KOH solution was added and mixed into powder mixture comprising 93.7 wt % of electrolytic manganese dioxide and 6.3 wt % of a conductive material, and then the mixture was press-molded to prepare a core of the cathode mixed material. By using this core of the cathode mixed material, a size AA dry cell was prepared, and its high-rate discharge characteristics were evaluated. In the evaluation, the number of pulses in the 1.5 W discharge (ANSI standard discharge) was obtained, and its relative value to the measurement result in Comparative Example 2 being 100%, was obtained.

<Evaluation of Powder Resistance of Electrolyte Manganese Dioxide>

By using the size AA dry cell prepared by the above-mentioned method, the powder resistance of the electrolytic manganese dioxide was evaluated by an AC impedance method. In the evaluation, an AC impedance measuring apparatus (ECI1287A, FRA1255A, manufactured by Toyo Corporation) was used, and the measurement was conducted at a measurement frequency of 120,000 Hz to 0.1 Hz and at an AC voltage ±5 mV. The analysis of measurement data was carried out by the Nyquist plots, and the resistance of the horizontal axis at the time when the imaginary component of the vertical axis of the semi-circular arc component was zero, was calculated, whereupon its relative value, as compared to the measurement result in Comparative Example 1 being 100%, was obtained and adopted as the resistance value of the electrolytic manganese dioxide.

Example 1

Electrolysis was conducted by using an electrolytic bath which has a heating device, and a titanium plate as an anode and a graphite plate as a cathode, which are suspended so as to face each other.

By supplying a manganese sulfate feed solution with a manganese ion concentration of 45 g/L to the electrolytic bath, maintaining the current density to be 0.34 A/dm$^2$ and the temperature of the electrolytic bath to be 97° C., and adjusting the sulfuric acid concentration at the initial stage of electrolysis and in the second period of electrolysis to be 35 g/L and 52 g/L, electrolysis was conducted for a total of 24 days, i.e. 18 days at the sulfuric acid concentration of the first period and 6 days at the sulfuric acid concentration of the second period.

After the electrolysis, the electrodeposited plate-shaped electrolytic manganese dioxide was washed with pure water and then milled to obtain a milled product of the electrolytic manganese dioxide. Next, this electrolytic manganese dioxide milled product was put in a water bath and stirred, and a 20 wt % sodium hydroxide aqueous solution was added, to conduct a neutralization treatment so as to bring the pH of the slurry to be 2.8. Then, the electrolytic manganese dioxide was washed with water, filtered for separation and dried to obtain an electrolytic manganese dioxide powder. The series of electrolysis conditions are shown in Table 1.

TABLE 1

| | | | Sulfuric acid concentration in electrolyte | | Number of days for electrolysis | | |
|---|---|---|---|---|---|---|---|
| | Current density (A/dm$^2$) | Electrolysis temperature (° C.) | Manganese concentration in the feed solution (g/L) | Initial concentration (g/L) | Concentration at termination (g/L) | Number of days after switching (days) | Total number of days for electrolysis (days) | Neutralized pH |
| Ex. 1 | 0.34 | 97 | 45 | 35 | 52 | 6 | 24 | 2.8 |
| Ex. 2 | 0.29 | 97 | 45 | 42 | — | — | 28 | 2.8 |
| Ex. 3 | 0.37 | 96 | 40 | 38 | 42 | 6 | 24 | 2.8 |
| Ex. 4 | 0.34 | 97 | 45 | 35 | 52 | 6 | 24 | 2.8 |
| Comp. Ex. 1 | 0.55 | 96 | 45 | 36 | — | — | 15 | 5.6 |
| Comp. Ex. 2 | 0.55 | 96 | 45 | 36 | 38 | 4 | 15 | 2.5 |

The obtained electrolytic manganese dioxide was γ phase. Of the electrolytic manganese dioxide, the half width of (110) was 2.09, the peak intensity ratio of (110)/(021) was 0.8, and the JIS-pH (K1467) was 2.0. These evaluation results are shown in Table 2.

TABLE 2

| | Half width of (110) (deg) | (110)/ (021) | JIS-pH | BET specific surface area (m$^2$/g) | Alkali potential (mV) | Na (ppm) | Sulfate radical (wt %) | Powder resistance (Ω) | Particle size formulation (B)/(A) |
|---|---|---|---|---|---|---|---|---|---|
| Ex. 1 | 2.09 | 0.8 | 2.0 | 27 | 296 | 1100 | 1.2 | 84 | — |
| Ex. 2 | 2.03 | 0.9 | 2.0 | 23 | 270 | 1050 | 1.2 | — | — |
| Ex. 3 | 2.22 | 0.9 | 2.0 | 27 | 292 | 1090 | 1.2 | — | 1.02 |
| Ex. 4 | 2.09 | 0.8 | 2.0 | 27 | 296 | 1100 | 1.2 | 95 | 1.04 |
| Comp. Ex. 1 | 2.8 | 0.7 | 3.5 | 34 | 286 | 1160 | 1.3 | — | — |
| Comp. Ex. 2 | 2.7 | 0.7 | 1.9 | 35 | 295 | 324 | 1.2 | 100 | — |

Further, the results of the press density and the high-rate discharge test are shown in Table 3.

TABLE 3

|  | Press density (%) | 1.5 W discharge (%) |
| --- | --- | --- |
| Ex. 1 | 102 | 105 |
| Ex. 2 | 103 | — |
| Ex. 3 | 103 | — |
| Ex. 4 | 105 | 107 |
| Comp. Ex. 1 | 100 | — |
| Comp. Ex. 2 | 100 | 100 |

Example 2

In the same manner as in Example 1, by adjusting the current density to be 0.29 A/dm² and the sulfuric acid concentration to be 42 g/L, electrolysis was conducted for 28 days.

After the electrolysis, the electrodeposited plate-shaped electrolytic manganese dioxide was washed with pure water and then milled to obtain a milled product of the electrolytic manganese dioxide. Next, this electrolytic manganese dioxide milled product was put in a water bath and stirred, and a 20 wt % sodium hydroxide aqueous solution was added, to conduct a neutralization treatment so as to bring the pH of the slurry to be 2.8. Then, the electrolytic manganese dioxide was washed with water, filtered for separation and dried to obtain an electrolytic manganese dioxide powder.

The obtained electrolytic manganese dioxide was γ phase. Of the electrolytic manganese dioxide, the half width of (110) was 2.03, the peak intensity ratio of (110)/(021) was 0.9, and the JIS-pH (K1467) was 2.0. These evaluation results are shown in Table 2.

Further, the result of the press density is in Table 3.

Example 3

In the same manner as in Example 1, by adjusting the manganese ion concentration to be 40 g/L, the current density to be 0.37 A/dm², the electrolytic bath temperature to be 96° C., and the sulfuric acid concentrations at the initial stage of electrolysis and in the second period of electrolysis to be 38 g/L and 42 g/L, electrolysis was conducted for a total of 24 days, i.e. 18 days at the sulfuric acid concentration in the first period and 6 days at the sulfuric acid concentration in the second period.

After the electrolysis, the electrodeposited plate-shaped electrolytic manganese dioxide was washed with pure water and then milled by a roller mill (Kurimoto roller mill 42-model, manufactured by Kurimoto, Ltd.) having a 37 kW mill motor and capable of milling a raw material having a hardness of a micro Vickers hardness of 400 HV (JIS Z2244), to obtain a milled product of the electrolytic manganese dioxide. Next, this electrolytic manganese dioxide milled product was put in a water bath and stirred, and a 20 wt % sodium hydroxide aqueous solution was added, to conduct a neutralization treatment so as to bring the pH of the slurry to be 2.8. Then, the electrolytic manganese dioxide was washed with water, filtered for separation and dried to obtain an electrolytic manganese dioxide powder.

The obtained electrolytic manganese dioxide was γ phase. Of this electrolytic manganese dioxide, the half width of (110) was 2.22, the peak intensity ratio of (110)/(021) was 0.9, and the JIS-pH (K1467) was 2.0. These evaluation results are shown in Table 2.

Further, the result of the press density is in Table 3.

Example 4

The electrolytic manganese dioxide obtained by the electrolysis test in Example 1 was further milled by a jet mill (single track jet mill, manufactured by Seishin Enterprise Co., Ltd.) to obtain an electrolytic manganese dioxide powder with a most frequent particle size of 10 μm. This powder and the powder in Example 1 were mixed in proportions of 20 wt % and 80 wt %, respectively, to obtain an electrolytic manganese dioxide powder.

Of the obtained electrolytic manganese dioxide, the most frequent particle size (A) was 48 μm, the particle size width (B) at a ½ height of the most frequent particle size was 50 μm, and the value of (B)/(A) was 1.04. These evaluation results are shown in Table 1.

The obtained electrolytic manganese dioxide was γ phase. Of this electrolytic manganese dioxide, the half width of (110) was 2.09, the peak intensity ratio of (110)/(021) was 0.8, and the JIS-pH (K1467) was 2.0. These evaluation results are shown in Table 2.

Further, the results of the press density and the high-rate discharge test are shown in Table 3.

Comparative Example 1

In the same manner as in Example 1, by adjusting the current density to be 0.55 A/dm², the temperature of the electrolytic cell to be 96° C., and the sulfuric acid concentration to be 36 g/L, electrolysis was conducted for 15 days.

After the electrolysis, the electrodeposited plate-shaped electrolytic manganese dioxide was washed with pure water and then milled to obtain a milled product of the electrolytic manganese dioxide. Next, this electrolytic manganese dioxide milled product was put in a water bath and stirred, and a 20 wt % sodium hydroxide aqueous solution was added, to conduct a neutralization treatment so as to bring the pH of the slurry to be 5.6. Then, the electrolytic manganese dioxide was washed with water, filtered for separation and dried to obtain an electrolytic manganese dioxide powder.

The obtained electrolytic manganese dioxide was γ phase. Of the electrolytic manganese dioxide, the half width of (110) was 2.80, the peak intensity ratio of (110)/(021) was 0.7, and the JIS-pH (K1467) was 3.5. These evaluation results are shown in Table 2.

Further, the result of the press density is shown in Table 3.

Comparative Example 2

In the same manner as in Example 1, by adjusting the current density to be 0.55 A/dm², the temperature of the electrolytic cell to be 96° C., and the sulfuric acid concentrations at the initial stage of electrolysis and in the second period of electrolysis to be 36 g/L and 38 g/L, electrolysis was conducted for a total of 15 days, i.e. 11 days at the sulfuric acid concentration of the first period, and 4 days at the sulfuric acid concentration of the second period.

After the electrolysis, the electrodeposited plate-shaped electrolytic manganese dioxide was washed with pure water and then milled to obtain a milled product of the electrolytic manganese dioxide. Next, this electrolytic manganese dioxide milled product was put in a water bath and stirred, and a 20 wt % sodium hydroxide aqueous solution was added, to conduct a neutralization treatment so as to bring the pH of the slurry to be 2.5. Then, the electrolytic manganese dioxide was washed with water, filtered for separation and dried to obtain an electrolytic manganese dioxide powder.

The obtained electrolytic manganese dioxide was γ phase. As the physical properties of this electrolytic manganese dioxide, the half width of (110) was 2.70, the peak intensity ratio of (110)/(021) was 0.7, and the JIS-pH (K1467) was 1.9. These evaluation results are shown in Table 2.

Further, the results of the press density and the high-rate discharge test are shown in Table 3.

From Tables 1 to 3, it is evident that by producing electrolytic manganese dioxide at a current density and a total number of days for electrolysis in Examples 1 to 4, it is possible to obtain electrolytic manganese dioxide excellent in crystallinity and JIS-pH as compared to Comparative Examples 1 and 2. Further, it is evident that the electrolytic manganese dioxide in Examples 1 to 4 shows an excellent press density (packing property) and high-rate discharge characteristics as compared to Comparative Examples 1 and 2.

The entire disclosures of Japanese Patent Application No. 2016-66038 filed on Mar. 29, 2016 and Japanese Patent Application No. 2016-213808 filed on Oct. 31, 2016 including specifications, claims, drawings and summaries are incorporated herein by reference in their entireties.

INDUSTRIAL APPLICABILITY

Since the electrolytic manganese dioxide of the present invention has a specific crystal structure, it is useful as a cathode active material for manganese dry cells, in particular alkaline manganese dry cells, excellent in packing property and discharge characteristics, in particular high-rate discharge characteristics.

The invention claimed is:

1. Electrolytic manganese dioxide, wherein a half width of the (110) plane in XRD measurement using CuKα line as a light source is at least 1.8° and less than 2.2°, a peak intensity ratio of X-ray diffraction peaks (110)/(021) is at least 0.70 and at most 1.00, and a JIS-pH (JIS K1467) is at least 1.5 and less than 5.0 and wherein, in a volume frequency distribution, with respect to a most frequent particle size (A) and a particle size width (B) at a ½ height of the most frequent particle size (A), the value of (B)/(A) is larger than 1.0 and at most 2.0.

2. The electrolytic manganese dioxide according to claim 1, wherein the half width of the (110) plane in XRD measurement using CuKα line as the light source is at least 2.0° and at most 2.1°.

3. The electrolytic manganese dioxide according to claim 1, wherein the peak intensity ratio of X-ray diffraction peaks (110)/(021) is at least 0.80 and at most 0.90.

4. The electrolytic manganese dioxide according to claim 1, wherein a BET specific surface area is at least 10 $m^2/g$ and at most 40 $m^2/g$.

5. The electrolytic manganese dioxide according to claim 1, wherein an alkali potential is at least 270 mV and less than 310 mV.

6. A method for producing the electrolytic manganese dioxide as defined in claim 1, wherein an electrolytic current density is at least 0.2 $A/dm^2$ and less than 0.5 $A/dm^2$, and a number of days for electrolysis is at least 18 days.

7. The method for producing the electrolytic manganese dioxide according to claim 6, wherein a sulfuric acid-manganese sulfate mixed solution is used whereby a sulfuric acid concentration in an electrolyte at the completion of electrolysis is higher than a sulfuric acid concentration in the electrolyte at initiation of electrolysis, and a sulfuric acid concentration in the electrolyte at completion of electrolysis is at least 32 g/L and at most 55 g/L.

8. A positive electrode active material for a battery, comprising the electrolytic manganese dioxide as defined in claim 1.

9. A battery comprising the positive electrode active material for a battery as defined in claim 8.

10. The electrolytic manganese dioxide of claim 1, wherein the value of (B)/(A) is 1.0 and at most 1.7.

11. The electrolytic manganese dioxide of claim 10, wherein the value of (B)/(A) is 1.1 and at most 1.6.

* * * * *